(12) United States Patent
Lee et al.

(10) Patent No.: US 9,525,323 B1
(45) Date of Patent: Dec. 20, 2016

(54) ENERGY HARVESTER SYSTEM

(71) Applicants: Timothy Lee, Cupertino, CA (US);
Wenbo Fan, Pleasonton, CA (US);
Selena Guo, San Ramon, CA (US);
Bryan Wu, Palo Alto, CA (US); Eric
Guo, Danville, CA (US); Jerry Xu,
Cupertino, CA (US)

(72) Inventors: Timothy Lee, Cupertino, CA (US);
Wenbo Fan, Pleasonton, CA (US);
Selena Guo, San Ramon, CA (US);
Bryan Wu, Palo Alto, CA (US); Eric
Guo, Danville, CA (US); Jerry Xu,
Cupertino, CA (US)

( * ) Notice: Subject to any disclaimer, the term of this patent is extended or adjusted under 35 U.S.C. 154(b) by 0 days.

(21) Appl. No.: 15/164,879

(22) Filed: May 26, 2016

Related U.S. Application Data

(63) Continuation of application No. 14/854,295, filed on Sep. 15, 2015, now abandoned.

(51) Int. Cl.
| F02B 63/04 | (2006.01) |
| H02K 7/10 | (2006.01) |
| H02K 7/18 | (2006.01) |
| F16H 1/20 | (2006.01) |
| F16H 53/02 | (2006.01) |
| F03G 7/08 | (2006.01) |
| F03G 3/06 | (2006.01) |

(52) U.S. Cl.
CPC .............. H02K 7/1853 (2013.01); F03G 3/06 (2013.01); F03G 7/08 (2013.01); F16H 1/20 (2013.01); F16H 53/02 (2013.01)

(58) Field of Classification Search
CPC ................ F03G 3/06; F03G 7/08; F16H 1/20; F16H 53/02; H02K 7/1853
USPC ......................................................... 290/1 C
See application file for complete search history.

(56) References Cited

U.S. PATENT DOCUMENTS

| 5,751,091 | A | * | 5/1998 | Takahashi | ............... | H02N 2/186 |
| | | | | | | 310/319 |
| 5,835,996 | A | * | 11/1998 | Hashimoto | ............ | G04C 10/00 |
| | | | | | | 310/319 |
| 6,483,276 | B1 | * | 11/2002 | Shimizu | ................ | G04C 10/00 |
| | | | | | | 290/1 C |
| 6,973,010 | B1 | * | 12/2005 | Koike | .................... | G04C 3/008 |
| | | | | | | 310/49.01 |

(Continued)

Primary Examiner — Tulsidas C Patel
Assistant Examiner — Thomas Quigley
(74) Attorney, Agent, or Firm — Jingming (James) Cai; SAC Attorneys LLP

(57) ABSTRACT

An energy harvester system including a primary energy collector (PEC), a cam gear ring, multiple secondary energy collectors (SEC), and a central gear is provided. The PEC and the SECs harness ambient motion energy. The PEC is attached to a support base member. The cam gear ring is operably engaged to the PEC and rotated by the PEC. The SECs are positioned in a space defined by the cam gear ring and rotated on receiving ambient motion energy. One SEC is unclamped from the support base member and slides towards the central gear when the cam gear ring contacts the SEC, while the other SECs are clamped on the support base member. The central gear operably engages with the unclamped SEC that slid towards the central gear and rotates with the unclamped SEC. The rotating central gear can be coupled to different power generating devices for generating electrical energy.

20 Claims, 15 Drawing Sheets

(56) References Cited

U.S. PATENT DOCUMENTS

| | | | |
|---|---|---|---|
| 7,411,320 B2* | 8/2008 | Bittner | F01B 1/062 310/20 |
| 7,485,992 B2* | 2/2009 | Ekchian | H02K 7/1861 310/268 |
| 8,096,103 B1* | 1/2012 | Watts | F01B 5/006 123/44 C |
| 2002/0067099 A1* | 6/2002 | Nagasaka | G04C 10/00 310/261.1 |
| 2003/0147087 A1* | 8/2003 | Nolte | G02B 21/248 356/614 |
| 2003/0198139 A1* | 10/2003 | Kitahara | G04C 17/0066 368/28 |
| 2004/0130157 A1* | 7/2004 | Naar | B60K 25/08 290/1 R |
| 2004/0137961 A1* | 7/2004 | Tu | H02K 7/1853 455/573 |
| 2009/0200983 A1* | 8/2009 | Dyer | H02J 7/32 320/107 |
| 2010/0242672 A1* | 9/2010 | Gutsche | F03G 3/08 74/84 R |
| 2013/0221680 A1* | 8/2013 | Mian | H02K 57/003 290/1 R |
| 2014/0300113 A1* | 10/2014 | Bachmann | F03G 7/08 290/1 R |

\* cited by examiner

ENERGY HARVESTER SYSTEM

CROSS-REFERENCE TO RELATED APPLICATIONS

This application is a continuation application of non-provisional patent application Ser. No. 14/854,295 titled "Energy Harvester System", filed on Sep. 15, 2015 in United States Patent and Trademark Office.

The specification and drawings of the above referenced application are herein incorporated by reference in their entirety.

BACKGROUND

Energy harvesting refers to a process of capturing energy from external sources, for example, kinetic energy, sunlight, wind, hydraulics, etc. Energy that is harvested from different sources is typically bountiful, and is present regardless of whether energy harvesting takes place. The harvested energy is often converted to electricity to power electronic devices. Most existing energy harvesting technologies focus on small systems that cannot provide sufficient power to commonly used electronic devices. In an era that emphasizes green technology, there is a need for finding new ways to save and reuse energy, while also making it affordable to do so. For devices such as smartphones, energy harvesting technologies with sufficient power would mean that people no longer need to tether their smartphones to sockets to charge their smartphones. Instead, people can use an energy harvesting technology to charge their smartphones on the go. Other devices, for example, communication radios and flashlights, would also benefit from energy harvesting technologies. In places where power sources may be unavailable, for example, underground mines, deserts, and remote areas, energy harvesting technologies could sustain small electronic devices indefinitely.

Energy harvesting technologies are used in many existing systems, for example automatic watches. An automatic watch captures a small amount of the energy generated during movement of a wearer's arm and uses the captured energy to wind a spring within the automatic watch. The spring slowly releases the energy, thereby powering gears and clock hands of the automatic watch. Therefore, the automatic watch does not rely on batteries or manual winding. The automatic watch functions as long as the wearer's arm moves. However, the automatic winding mechanism is not suitable for large devices since the automatic winding mechanism provides insufficient power of, for example, few milliwatts.

Conventional energy harvester systems use micro-electrostatic vibrations to generate electricity. The reduction in size and power consumption of complementary metal-oxide semiconductor (CMOS) circuitry has led to research based on wireless sensor networks. Proposed networks include thousands of small wireless nodes that operate in a multi-hop fashion, replacing long transmission distances with multiple low power and low cost wireless devices. The result is a creation of an intelligent environment that responds to its inhabitants and ambient conditions. Wireless devices being designed and built for use in such environments typically run on batteries. However, as networks increase in number and devices decrease in size, the replacement of depleted batteries is not practical. The cost of replacing batteries in a few devices that make up a small network about once a year is feasible. However, the cost of replacing thousands of devices annually, some of which are in areas difficult to access, is not practical. Another approach would be to use a battery that is large enough to last the entire lifetime of a wireless sensor device. However, a battery large enough to last the lifetime of the wireless sensor device would dominate the overall system size and cost, and thus is not practical. There is a need for alternative methods of powering devices that make up wireless networks. A conventional energy harvester system converts micro electrostatic vibration to electricity using a microelectromechanical systems (MEMS) fabrication technology with an output power density of, for example, about 116 $\mu W/cm^3$. However, the MEMS based energy harvester system is expensive and generates low power.

Other conventional energy harvesting systems are compatible with mobile devices. The mobile devices domain comprises, for example, sound energy harvesting, electromagnetic wave energy harvesting, and photo cell energy harvesting, for example, solar cell energy harvesting. When a person speaks over a mobile device, for example, a phone, sound energy is used to vibrate a coil or a magnet in the phone to generate electricity. Electromagnetic waves are ubiquitous and received by a coil with an iron core to generate electricity. Photons, for example, from the sun or a lamp are also ubiquitous. Photodiodes mounted on the surface of a mobile device receive light and generate electrical current. Combining these energy harvesting techniques with mechanical energy harvesting techniques reduces the size of an energy harvester and provides sufficient energy to power small portable devices at the same time. However, the energy generated is insufficient for large devices.

Another conventional energy harvesting system includes a device that generates electricity from mechanical energy when embedded in a vibrating medium. Supplying power to remote microsystems that have no physical connection to the outside world is difficult, and using batteries is not always appropriate. A micro generator generates electricity from mechanical energy when embedded in a vibrating medium. This micro generator has dimensions of, for example, about 5 mm×5 mm×1 mm. Analysis predicts that power produced is proportional to a cube of the frequency of vibration, and that to maximize power generation, the mass deflection should be as large as possible. Power generation of, for example, about 1 $\mu W$ at 70 Hz and 0.1 mW at 330 Hz are predicted for a typical device, assuming a deflection of 50 $\mu m$.

In another conventional energy harvesting system, a generator produces sufficient electricity from random, ambient vibrations to power a wristwatch, a pacemaker, or a wireless sensor. Energy harvesting devices created in this manner provide renewable electrical power from arbitrary, non-periodic vibrations. Non-periodic vibrations are obtained, for example, from traffic driving on bridges, machinery operating in industries, and humans moving their limbs. According to a research study, a generator harnesses energy from nearby vibrations using piezoelectric materials. The piezoelectric materials create a charge when stressed. The piezoelectric materials allow each generator of one cubic centimeter in volume to create power of, for example, about 0.5 milliwatts, which can potentially be used to drive small autonomous devices, for example, pace makers. The conventional energy harvesting systems using piezoelectric materials generate insufficient power to power a standard portable electronic device. Moreover, the piezoelectric materials are expensive. In an experimental study, micro electrostatic vibration-to-electricity converters using the microelectromechanical systems (MEMS) fabrication technology with an output power density of, for example, about 116 µW/cm³ are designed.

Another conventional energy harvester system utilizes sensitive vibrations to generate electrical energy. A vibration energy harvester is capable of using mechanical energy to harvest useful energy. This conventional vibration energy harvester that generates electrical energy from mechanical energy utilizes a complex mechatronic device, which includes a precise mechanical part, an electromagnetic converter, power electronics for power management, and a load. The energy generated by the above systems is insufficient for large devices.

Hence, there is a long felt but unresolved need for an affordable and easily available energy harvester system that generates sufficient power for powering electronic devices, for example, smartphones, communication radios, flashlights, etc.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The energy harvester system disclosed herein addresses the above mentioned needs for generating sufficient power for powering electronic devices, for example, smartphones, communication radios, flashlights, etc. The energy harvester system disclosed herein comprises a support base member, a primary energy collector, a cam gear ring, multiple secondary energy collectors, and a central gear. The energy harvester system harnesses ambient motion energy and converts the ambient motion energy to a rotational motion of the central gear, which is used for generating electricity.

In the energy harvester system disclosed herein, the primary central axial member is attached to the support base member. The primary energy collector is rotatably connected to the primary central axial member. The cam gear ring is operably engaged to the primary energy collector and rotated by the primary energy collector. The secondary energy collectors are positioned in a space defined by the cam gear ring and rotated on receiving ambient motion energy. One of the secondary energy collectors can be unclamped from the support base member and slides towards a central gear when the cam gear ring contacts that secondary energy collector, while the other secondary energy collectors are clamped on the support base member. The central gear is operably engaged to the unclamped secondary energy collector that slid towards the central gear to rotate with that unclamped secondary energy collector for generation of electrical energy. The rotating central gear can be coupled to different electrical power generating devices to generate electricity.

In an embodiment, the energy harvester system disclosed herein further comprises multiple pins extending from an upper surface of the support base member and positioned proximal to an inner surface of the cam gear ring. Each of the pins is configured to engage with a clamping member of each of the secondary energy collectors for clamping each of the secondary energy collectors to the support base member. The clamping member is attached to and extends from a secondary base of each secondary energy collector. The clamping member clamps each secondary energy collector to one of the pins. The clamping member is further configured to unclamp each secondary energy collector from one of the pins when the cam gear ring contacts the clamping member.

In an embodiment, the energy harvester system disclosed herein further comprises multiple guide elements positioned on the upper surface of the support base member within the space defined by the cam gear ring. Each of the guide elements comprises a slot configured to slidably engage with a guide projection of a corresponding one of the secondary energy collectors. The secondary energy collector that is unclamped from a corresponding pin is configured to slide towards the central gear via a corresponding guide element. The guide projection of each of the secondary energy collectors extends from a lower surface of the secondary base of each secondary energy collector. The guide projection of the unclamped secondary energy collector is configured to slide within the slot of the guide element to slide the unclamped secondary energy collector towards the central gear.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE INVENTION

Figure 1:
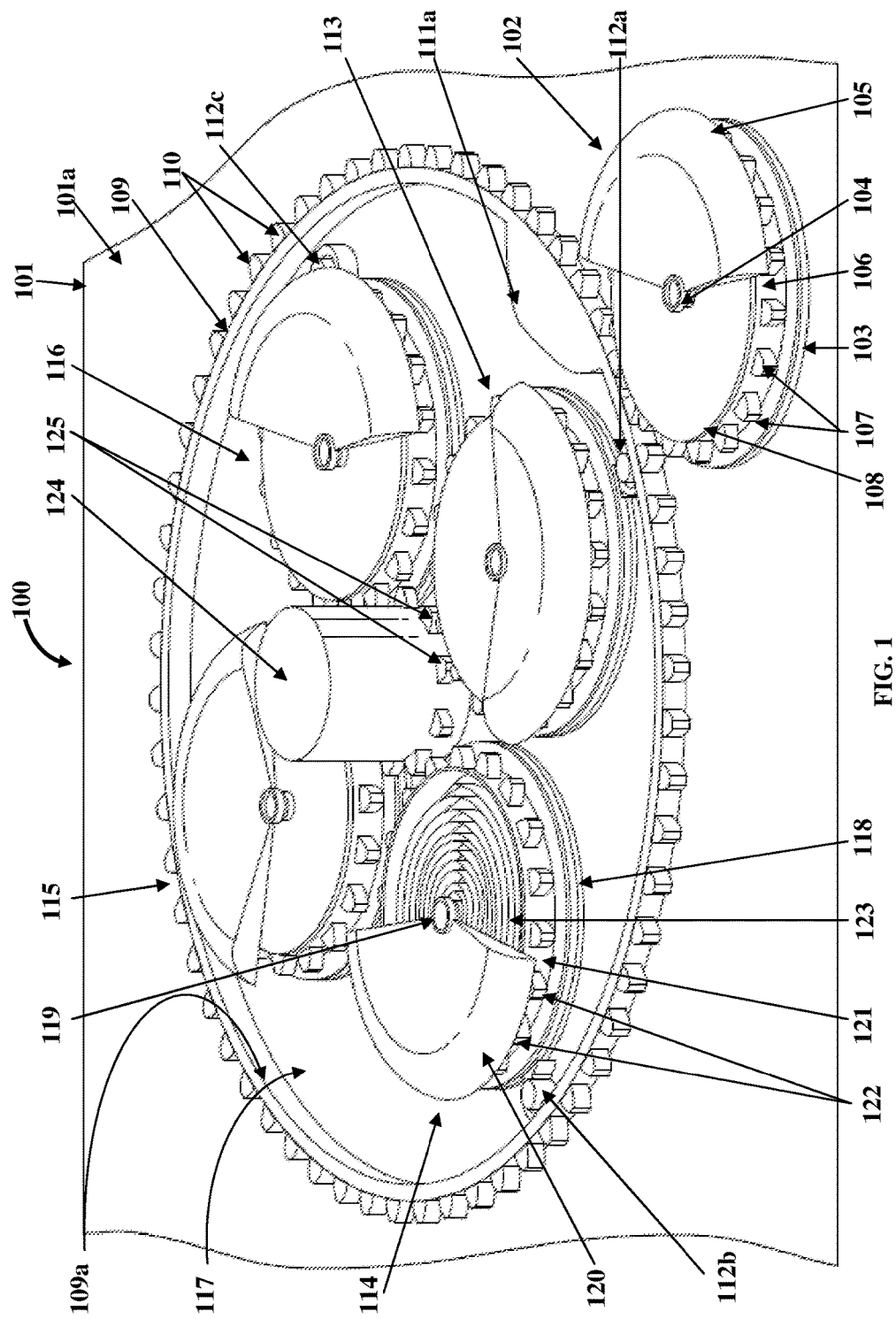
FIG. 1 exemplarily illustrates a top perspective view of an energy harvester system.

FIG. 1 exemplarily illustrates a top perspective view of an energy harvester system 100. The energy harvester system 100 disclosed herein harnesses ambient motion energy and converts the harnessed ambient motion energy to rotational motion of a central gear 124, which is used for generating electrical energy. The energy harvester system 100 disclosed herein comprises a support base member 101, a primary energy collector 102, a cam gear ring 109 with a cam element 111a, multiple secondary energy collectors 113, 114, 115, and 116, and the central gear 124. In an embodiment, the support base member 101 is, for example, a rear panel of an electronic device, for example, a smartphone. The primary energy collector 102 is attached to the support base member 101. As exemplarily illustrated in FIG. 1, the primary energy collector 102 comprises a primary base 103 and a primary central axial member 104. The primary base 103 of the primary energy collector 102 is attached to an upper surface 101a of the support base member 101. The primary central axial member 104 is fixedly attached to the upper surface 101a of the support base member 101. The primary energy collector 102 further comprises a primary pendulum member 105 and a primary geared case 106 with primary gear tooth elements 107 as disclosed in the detailed description of FIGS. 3A-3B. In an embodiment, the primary energy collector 102 further comprises a primary case cover 108 as disclosed in the detailed description of FIG. 3A.

The cam gear ring 109 encircles the secondary energy collectors 113, 114, 115 and 116. The cam gear ring 109 is operably engaged to the primary energy collector 102 and is rotated by the primary energy collector 102. In an embodiment, the cam gear ring 109 further comprises one cam element 111a exemplarily illustrated in FIG. 1, or multiple cam elements, for example, two cam elements 111a and 111b exemplarily illustrated in FIG. 7, extending from an inner surface 109a of the cam gear ring 109. The secondary energy collectors 113, 114, 115, and 116 are positioned in a space 117 defined by the cam gear ring 109 and rotated on receiving ambient motion energy. In an embodiment as exemplarily illustrated in FIG. 1, the secondary energy collectors 113, 114, 115, and 116 are positioned concentrically around the central gear 124. Each of the secondary energy collectors 113, 114, 115, and 116 comprises a secondary base 118, a secondary central axial member 119, a secondary pendulum member 120, a secondary geared case 121 with secondary gear tooth elements 122, and a secondary spring element 123 as disclosed in the detailed description of FIGS. 4A-4B. In an embodiment, the energy harvester system 100 disclosed herein further comprises multiple pins 112a, 112b, 112d, and 112c extending from the upper surface 101a of the support base member 101 as exemplarily illustrated in FIG. 2. For each rotation of the cam gear ring 109, the cam element 111a of the cam gear ring 109 is configured to contact a clamping member 134 exemplarily illustrated in FIG. 6, of each of the secondary energy collectors 113, 114, 115, and 116 to unclamp each of the secondary energy collectors 113, 114, 115, and 116 from a corresponding one of the pins 112a, 112b, 112d, and 112c respectively.

Figure 2:
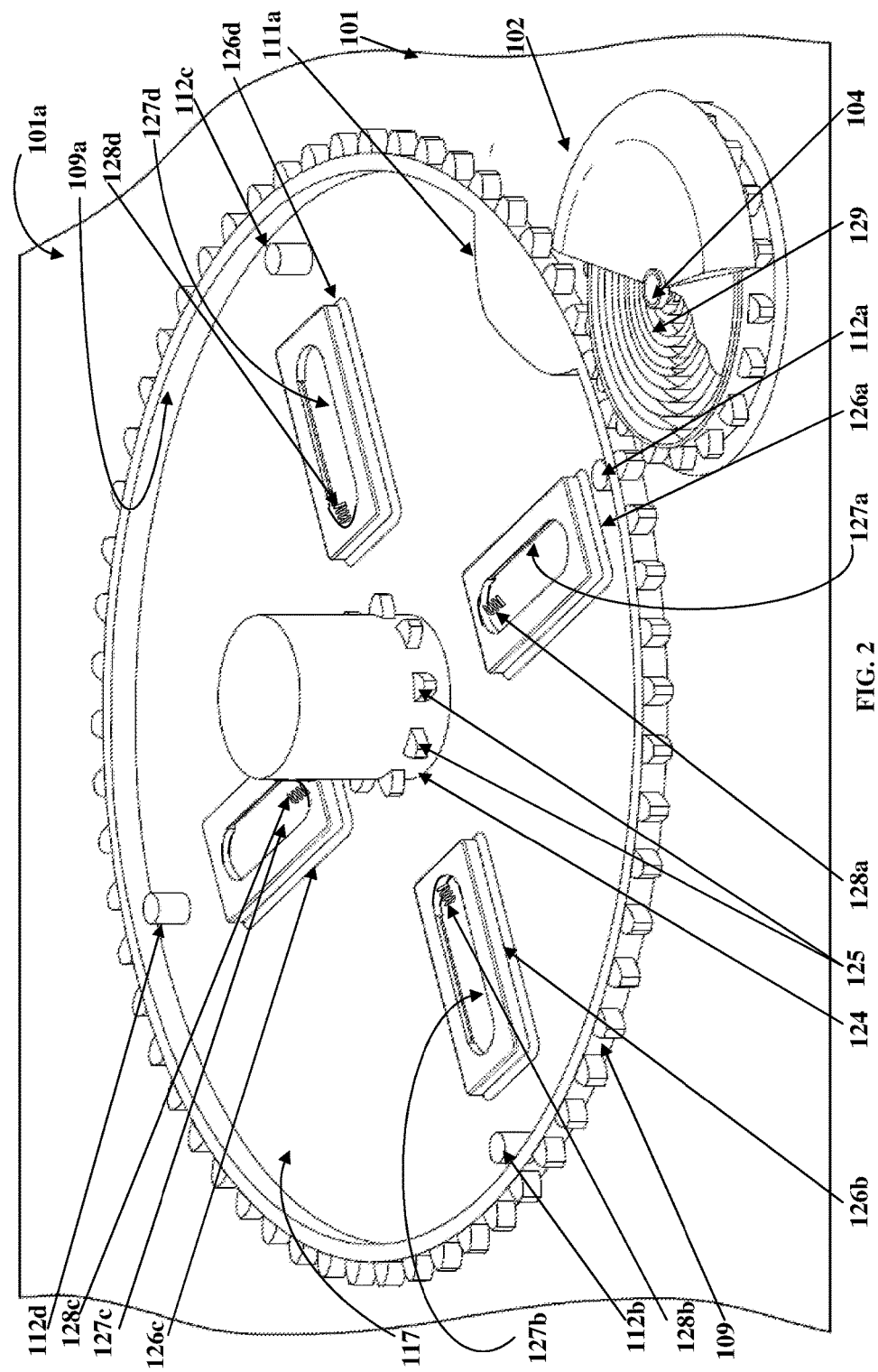
FIG. 2 exemplarily illustrates a top perspective, partial view of the energy harvester system showing multiple guide elements.

FIG. 2 exemplarily illustrates a top perspective, partial view of the energy harvester system 100 exemplarily illustrated in FIG. 1, showing multiple guide elements 126a, 126b, 126c, and 126d positioned around the central gear 124. In an embodiment, the energy harvester system 100 disclosed herein comprises multiple guide elements 126a, 126b, 126c, and 126d positioned on the upper surface 101a of the support base member 101 within the space 117 defined by the cam gear ring 109. The guide elements 126a, 126b, 126c, and 126d are positioned below the secondary energy collectors 113, 114, 115, and 116 exemplarily illustrated in FIG. 1, respectively. The guide elements 126a, 126b, 126c, and 126d comprise slots 127a, 127b, 127c, and 127d respectively, configured to slidably engage with guide projections of the secondary energy collectors 113, 114, 115, and 116 respectively. The secondary energy collectors 113, 114, 115, and 116 are seated in their respective slots 127a, 127b, 127c, and 127d. Each of the slots 127a, 127b, 127c, and 127d is configured in a geometric shape. For example, the slot 127a is configured to engage with the guide projection 132a to form a dovetail as exemplarily illustrated in FIG. 4C. The energy harvester system 100 disclosed herein further comprises restoring spring elements 128a, 128b, 128c, and 128d positioned in the guide elements 126a, 126b, 126c, and 126d respectively, and facing proximal to the central gear 124. The restoring spring element, for example, 128a returns an unclamped secondary energy collector, for example, 113 towards the pin 112a for clamping by the clamping member 134 exemplarily illustrated in FIG. 6. The restoring spring element 128a pushes the unclamped secondary energy collector 113 back to clamp with the pin 112a once the cam element 111a moves away. The pins 112a, 112b, 112d, and 112c are positioned proximal to the inner surface 109a of the cam gear ring 109. As exemplarily illustrated in FIG. 2, the primary energy collector 102 further comprises a primary spring element 129 wound around the primary central axial member 104 as disclosed in the detailed description of FIGS. 3A-3B.

Figure 3A:
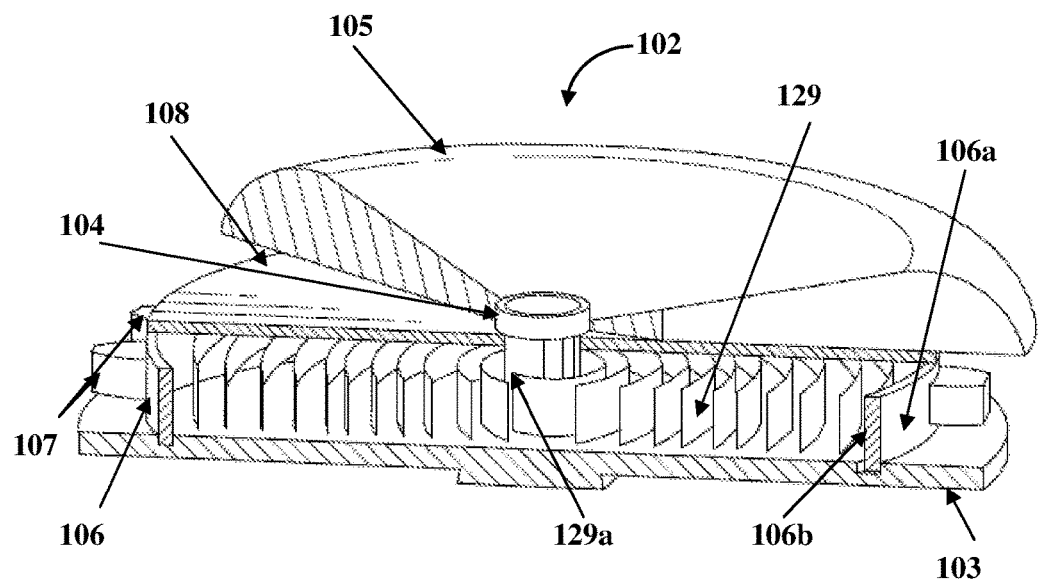
FIG. 3A exemplarily illustrates a sectional view of a primary energy collector of the energy harvester system.
Figure 3B:
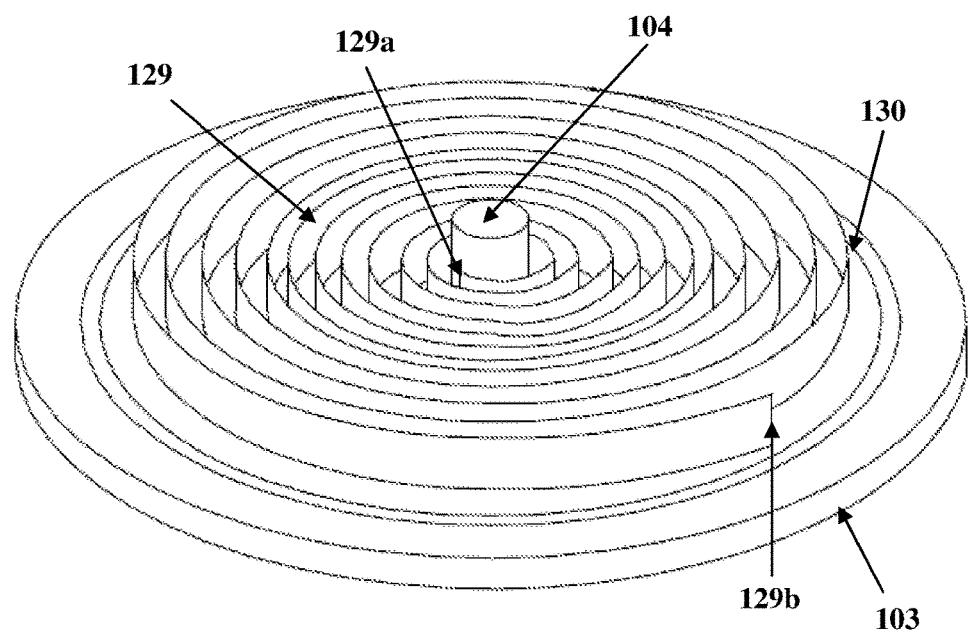
FIG. 3B exemplarily illustrates a top perspective, cutaway view of the primary energy collector, showing a primary base, a primary base groove, and a primary spring element of the primary energy collector.

FIG. 3A exemplarily illustrates a sectional view of the primary energy collector 102 of the energy harvester system 100 exemplarily illustrated in FIG. 1. The primary central axial member 104 is positioned on and fixedly attached to the primary base 103 of the primary energy collector 102. The primary pendulum member 105 is rotatably connected to the primary central axial member 104. The primary pendulum member 105 is, for example, an oscillating weight that is free to rotate about the primary central axial member 104. The primary pendulum member 105 is actuated by ambient motion energy and rotated in a clockwise direction or a counterclockwise direction. That is, the ambient motion energy rotates the primary pendulum member 105 in a clockwise direction or a counterclockwise direction. In an embodiment, the primary pendulum member 105 is rigidly attached to the primary geared case 106, thereby causing the primary geared case 106 to rotate when the primary pendulum member 105 rotates. The primary geared case 106 of the primary energy collector 102 encircles the primary spring element 129 and the primary central axial member 104. The primary geared case 106 runs along a primary base groove 130 exemplarily illustrated in FIG. 3B, configured in the primary base 103. The primary geared case 106 comprises a multiple primary gear tooth elements 107 positioned on an outer surface 106a of the primary geared case 106. The primary spring element 129 of the primary energy collector 102 is attached to the primary geared case 106 and the primary central axial member 104. The primary spring element 129 is wound around the primary central axial member 104 within the primary geared case 106. The primary spring element 129 comprises a first end 129a and a second end 129b exemplarily illustrated in FIG. 3B. The first end 129a of the primary spring element 129 is fixedly attached to the primary central axial member 104. The second end 129b of the primary spring element 129 exemplarily illustrated in FIG. 3B, is fixedly attached to the inner surface 106b of the primary geared case 106. In an embodiment, the primary case cover 108 of the primary energy collector 102 is removably attached to the primary geared case 106. The primary case cover 108 is positioned below the primary pendulum member 105 and above the primary spring element 129. The primary case cover 108 is further positioned generally parallel to the primary pendulum member 105 and covers the primary spring element 129. In an embodiment, the primary pendulum member 105 is rigidly attached to the primary case cover 108, which is rigidly attached to the primary geared case 106, thereby causing the primary geared case 106 to rotate when the primary pendulum member 105 rotates.

FIG. 3B exemplarily illustrates a top perspective, cutaway view of the primary energy collector 102 exemplarily illustrated in FIG. 3A, showing the primary base 103, the primary base groove 130, and the primary spring element 129 of the primary energy collector 102. The primary geared case 106 exemplarily illustrated in FIG. 3A, is detachably clamped to the primary base groove 130 configured in the primary base 103 and encircles the primary central axial member 104. The primary geared case 106 is configured to unclamp from the primary base groove 130 and rotate relative to the primary base 103 along the primary base groove 130. The primary spring element 129 is wound around the primary central axial member 104 within the primary geared case 106. The first end 129a of the primary spring element 129 is fixedly attached to the primary central axial member 104, and the second end 129b of the primary spring element 129 is fixedly attached to the inner surface 106b of the primary geared case 106 exemplarily illustrated in FIG. 3A. The primary geared case 106 rotates relative to the primary base 103 along the primary base groove 130 when unclamped from the primary base groove 130.

Figure 4A:
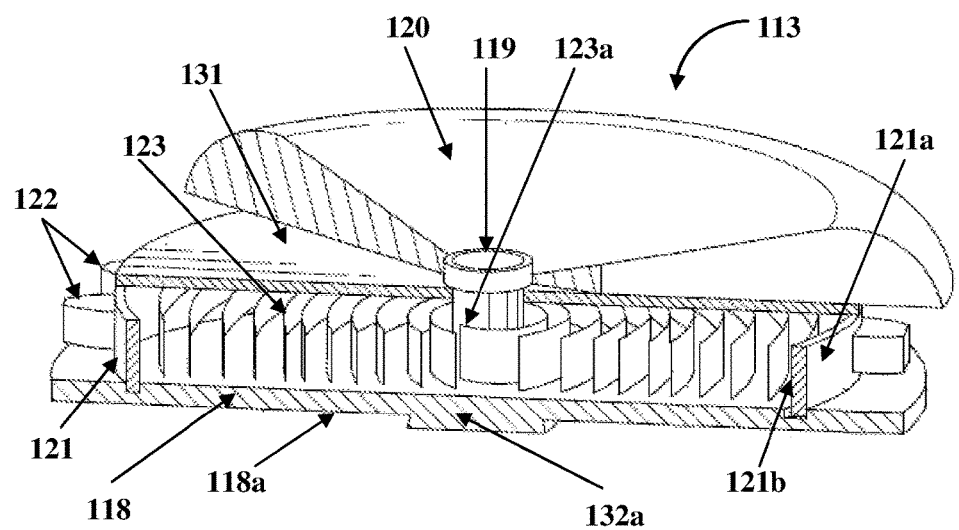
FIG. 4A exemplarily illustrates a sectional view of a secondary energy collector of the energy harvester system.

FIG. 4A exemplarily illustrates a sectional view of a secondary energy collector 113 of the energy harvester system 100 exemplarily illustrated in FIG. 1. Each of the other secondary energy collectors 114, 115, and 116 exemplarily illustrated in FIG. 1, comprise the structural components of the secondary energy collector 113 shown in FIG. 4A. To disclose the structural components of all the secondary energy collectors 113, 114, 115, and 116, the secondary energy collector 113 is shown and described as an example. The secondary energy collector 113 comprises a secondary base 118, a secondary central axial member 119, a secondary pendulum member 120, a secondary geared case 121, and a secondary spring element 123. The secondary base 118 is attached to the upper surface 101a of the support base member 101 exemplarily illustrated in FIG. 1. The secondary central axial member 119 is positioned on and fixedly attached to the secondary base 118. The secondary pendulum member 120 is rotatably connected to the secondary central axial member 119. The secondary pendulum member 120 is actuated by ambient motion energy and rotated in a clockwise direction or a counterclockwise direction. In an embodiment, the secondary pendulum member 120 is rigidly attached to the secondary geared case 121, thereby causing the secondary geared case 121 to rotate when the secondary pendulum member 120 rotates.

Figure 4B:
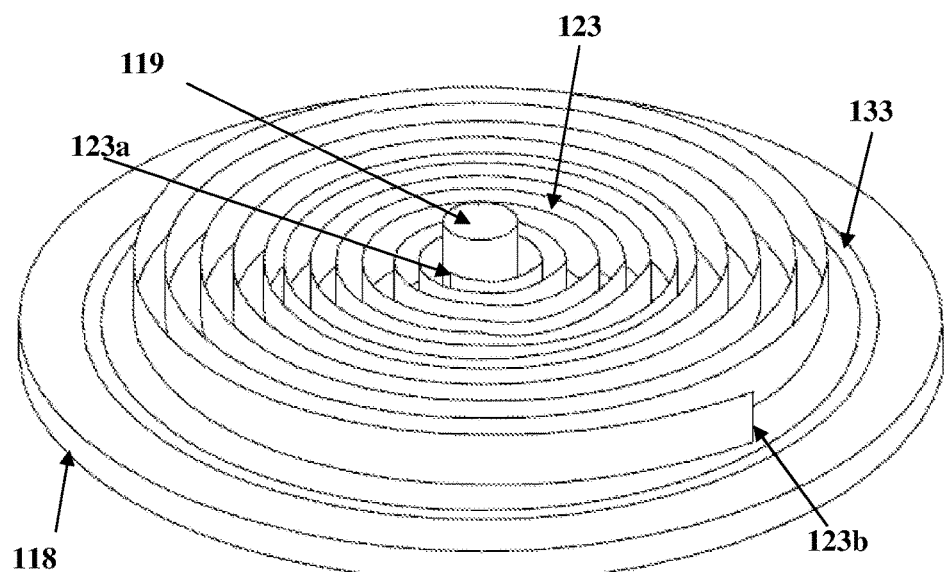
FIG. 4B exemplarily illustrates a top perspective, cutaway view of the secondary energy collector, showing a secondary base, a secondary base groove, and a secondary spring element of the secondary energy collector.

The secondary geared case 121 encircles the secondary central axial member 119 and the secondary spring element 123 as exemplarily illustrated in FIG. 4A. The secondary geared case 121 runs along a secondary base groove 133 exemplarily illustrated in FIG. 4B, configured in the secondary base 118. The secondary geared case 121 comprises multiple secondary gear tooth elements 122 positioned on an outer surface 121a of the secondary geared case 121. The secondary spring element 123 is wound around the secondary central axial member 119 within the secondary geared case 121. The secondary spring element 123 comprises a first end 123a and a second end 123b exemplarily illustrated in FIG. 4B. The first end 123a of the secondary spring element 123 is fixedly attached to the secondary central axial member 119. The second end 123b of the secondary spring element 123 exemplarily illustrated in FIG. 4B, is fixedly attached to the inner surface 121b of the secondary geared case 121. In an embodiment, the secondary energy collector 113 further comprises a secondary case cover 131 removably attached to the secondary geared case 121 and positioned below the secondary pendulum member 120. The secondary case cover 131 is further positioned above the secondary spring element 123 and generally parallel to the secondary pendulum member 120. In an embodiment, the secondary pendulum member 120 is rigidly attached to the secondary case cover 131, which is rigidly attached to the secondary geared case 121, thereby causing the secondary geared case 121 to rotate when the secondary pendulum member 120 rotates. In an embodiment, the secondary energy collector 113 further comprises a guide projection 132a extending from a lower surface 118a of the secondary base 118.

FIG. 4B exemplarily illustrates a top perspective, cutaway view of the secondary energy collector 113 exemplarily illustrated in FIG. 4A, showing the secondary base 118, the secondary base groove 133, and the secondary spring element 123 of the secondary energy collector 113. The secondary geared case 121 exemplarily illustrated in FIG. 4A, is detachably clamped within the secondary base groove 133 configured in the secondary base 118 and encircles the secondary central axial member 119 exemplarily illustrated in FIG. 4B. The secondary geared case 121 is configured to unclamp from the secondary base groove 133 and rotate relative to the secondary base 118 along the secondary base groove 133. The secondary spring element 123 is wound around the secondary central axial member 119 within the secondary geared case 121. The first end 123a of the secondary spring element 123 is fixedly attached to the secondary central axial member 119 and the second end 123b of the secondary spring element 123 is fixedly attached to the inner surface 121b of the secondary geared case 121 exemplarily illustrated in FIG. 4A.

Figure 4C:
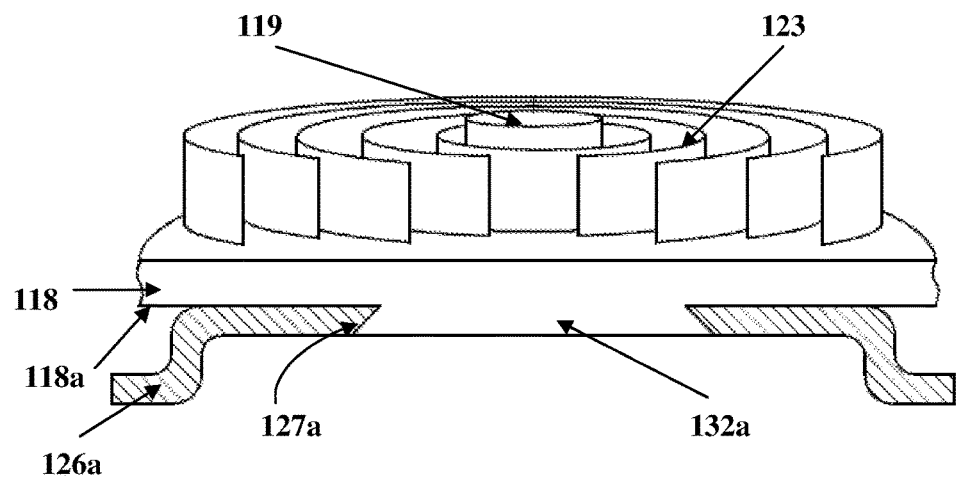
FIG. 4C exemplarily illustrates a front perspective, cutaway view of the secondary energy collector, showing a sectional view of a guide projection engaged in a slot of a guide element.

FIG. 4C exemplarily illustrates a front perspective, cutaway view of the secondary energy collector 113 exemplarily illustrated in FIG. 4A, showing a sectional view of a guide projection 132a engaged in a slot 127a of a guide element 126a. The guide projection 132a enables the secondary base 118 of the secondary energy collector 113 to be seated in the guide element 126a. The guide element 126a remains stationary while the guide projection 132a of the secondary energy collector 113 slides along the slot 127a of the guide element 126a when the secondary energy collector 113 is unclamped. The guide projection 132a is configured to slide within the slot 127a of the guide element 126a positioned on the upper surface 101a of the support base member 101 within the space 117 defined by the cam gear ring 109 exemplarily illustrated in FIG. 1, to slide the unclamped secondary energy collector 113 towards the central gear 124.

Figure 5:
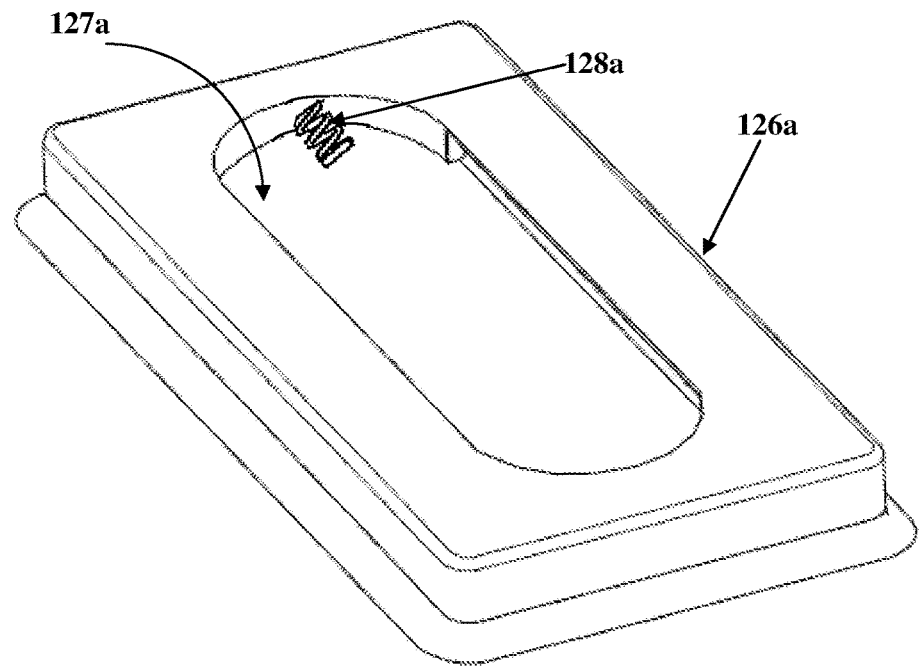
FIG. 5 exemplarily illustrates a top perspective view of a guide element of the energy harvester system.

FIG. 5 exemplarily illustrates a top perspective view of a guide element 126a of the energy harvester system 100 exemplarily illustrated in FIG. 1, showing a slot 127a. The guide projection 132a of the secondary energy collector 113 exemplarily illustrated in FIG. 4A and FIG. 4C, is seated in the slot 127a of the guide element 126a. In an embodiment, the guide projections of the secondary energy collectors 113, 114, 115, and 116 exemplarily illustrated in FIG. 1, are of a geometric shape conforming to a shape of the slots 127a, 127b, 127c, and 127d of the guide elements 126a, 126b, 126c, and 126d respectively, exemplarily illustrated in FIG. 2. For example, the guide projection 132a of the secondary energy collector 113 fits into the slot 127a of the guide element 126a to form a dovetail as exemplarily illustrated in FIG. 4C. The guide element 126a further comprises a restoring spring element 128a configured to restore an unclamped secondary energy collector 113 back to a clamped position once the cam element 111a exemplarily illustrated in FIG. 1, moves out of contact with the secondary energy collector 113.

Figure 6:
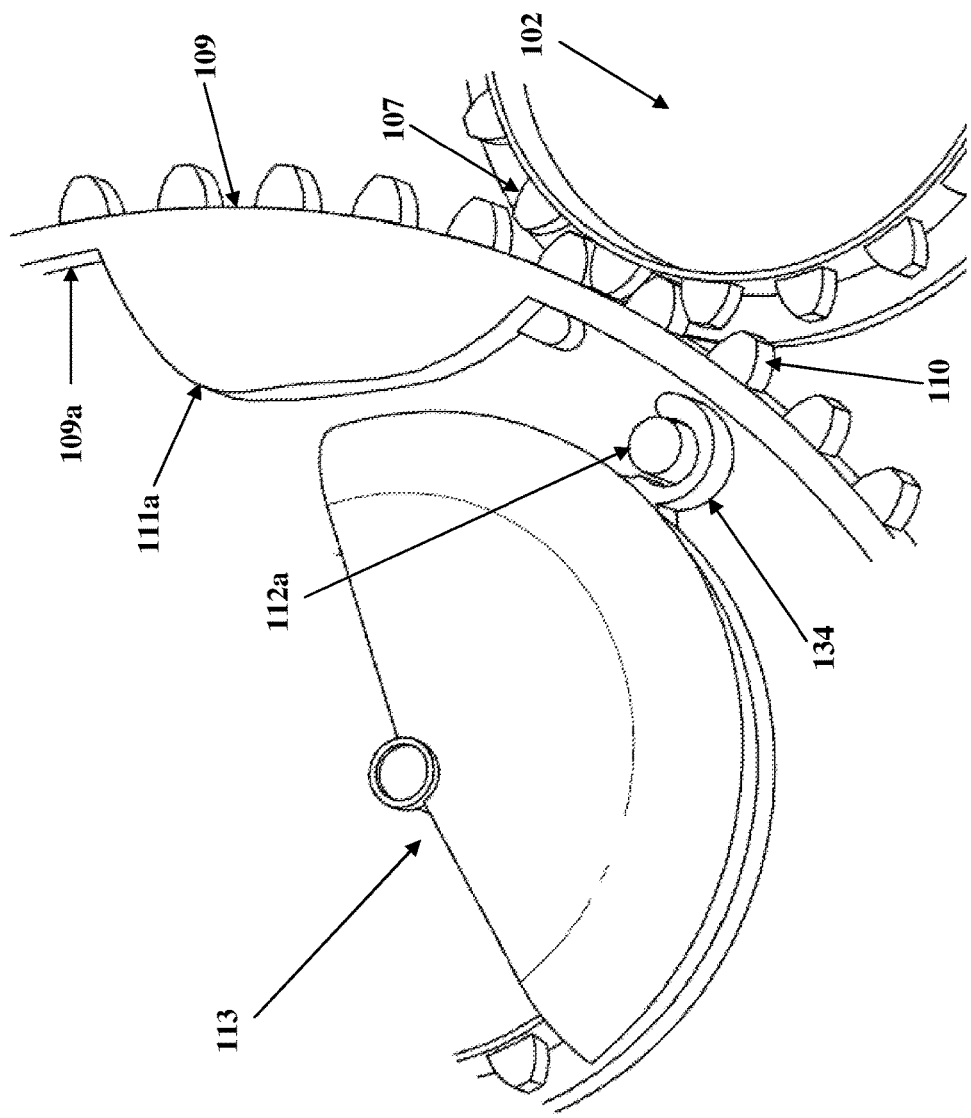
FIG. 6 exemplarily illustrates a top perspective view showing a secondary energy collector clamped to a pin.

FIG. 6 exemplarily illustrates a top perspective view showing a secondary energy collector, for example, 113 clamped to a pin 112a. In an embodiment, each of the secondary energy collectors 113, 114, 115, and 116 exemplarily illustrated in FIG. 1, further comprises a clamping member 134 fixedly attached to and extending from the secondary base 118 of each of the secondary energy collectors 113, 114, 115, and 116. To disclose the clamping member 134 of each of the secondary energy collectors 113, 114, 115, and 116, the clamping member 134 of the secondary energy collector 113 is exemplarily illustrated in FIG. 6 and described herein. For example, the clamping member 134 is fixedly attached to and extends from the secondary base 118 of the secondary energy collector 113. The clamping members 134 of the secondary energy collectors 113, 114, 115, and 116 are configured to clamp the secondary energy collectors 113, 114, 115, and 116 to corresponding pins 112a, 112b, 112d, and 112c respectively, exemplarily illustrated in FIGS. 1-2. For example, the secondary energy collector 113 is clamped to the pin 112a, and the secondary energy collector 116 is clamped to the pin 112c exemplarily illustrated in FIG. 1. The pin 112a engages with the clamping member 134 of the secondary energy collector 113 for clamping the secondary energy collector 113 to the support base member 101 exemplarily illustrated in FIG. 1. The clamping member 134 unclamps one of the secondary energy collectors 113, 114, 115, 116 from the corresponding one of the pins 112a, 112b, 112d, and 112c respectively. For example, the clamping member 134 unclamps the secondary energy collector 113 from the pin 112a when the cam element 111a of the rotating cam gear ring 109 contacts the clamping member 134. For each rotation of the cam gear ring 109, the secondary energy collectors 113, 114, 115, and 116 are sequentially unclamped once from the pins 112a, 112b, 112d, and 112c respectively.

For example, the cam element 111a of the cam gear ring 109 contacts the clamping member 134 of the secondary energy collector 113 and unclamps the secondary energy collector 113, and then the cam element 111a unclamps the other secondary energy collectors 114, 115, and 116.

The cam element 111a of the cam gear ring 109 extends from the inner surface 109a of the cam gear ring 109. The cam element 111a is configured to contact the clamping member 134 of the secondary energy collector 113 to unclamp the secondary energy collector 113 from the pin 112a. The cam element 111a positioned on the inner surface 109a of the cam gear ring 109 contacts and releases the clamping member 134 from the pin 112a when the cam gear ring 109 rotates. This results in the secondary energy collector 113 being unclamped. In an embodiment, the cam element 111a is configured at an elevated position to unclamp one of the secondary energy collectors 113, 114, 115, and 116 and continue to unclamp the next secondary energy collector without being obstructed by the pins 112a, 112b, 112d, and 112c respectively.

Figure 7:
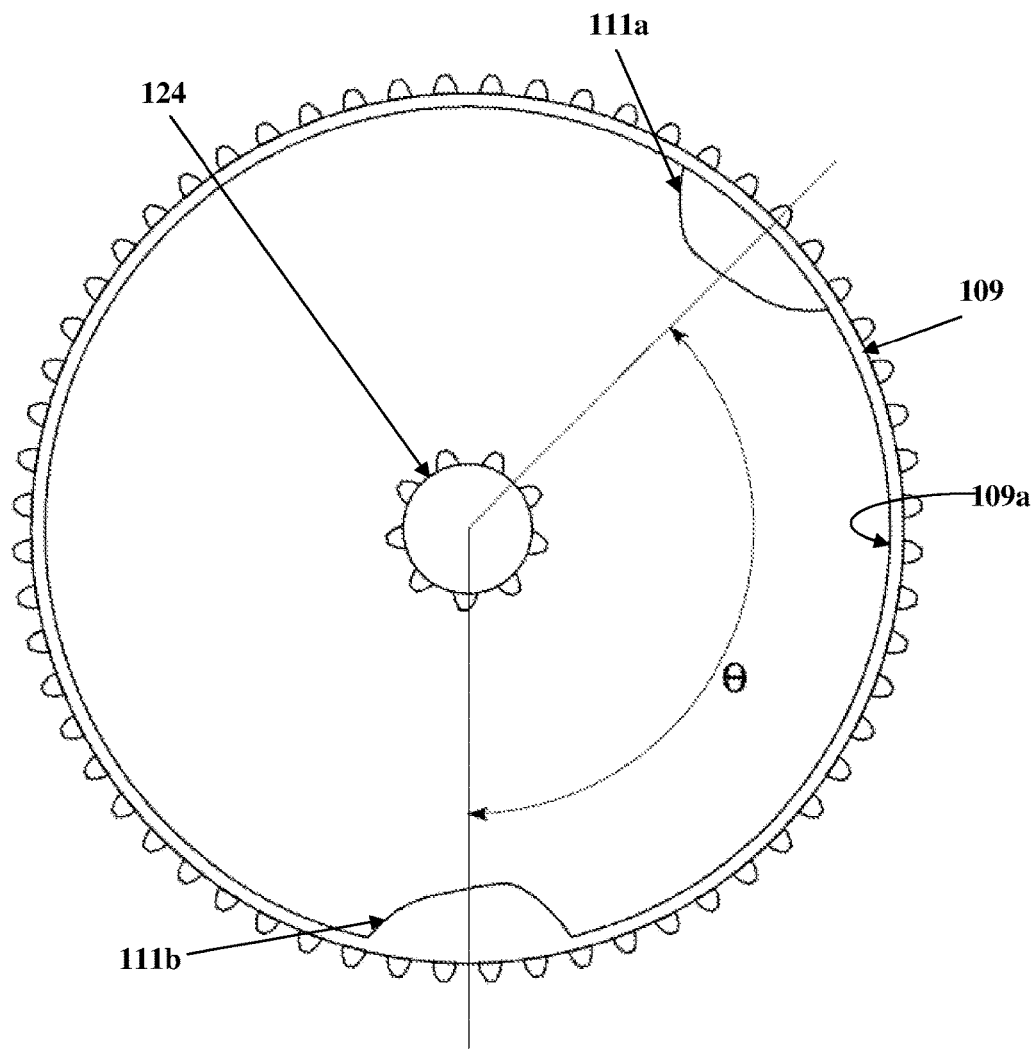
FIG. 7 exemplarily illustrates an embodiment of the energy harvester system, showing a cam gear ring with two cam elements.

FIG. 7 exemplarily illustrates an embodiment of the energy harvester system 100 exemplarily illustrated in FIG. 1, showing a cam gear ring 109 with two cam elements 111a and 111b. In the embodiment, the cam gear ring 109 comprises multiple cam elements, for example, two cam elements 111a and 111b exemplarily illustrated in FIG. 7, extending from the inner surface 109a of the cam gear ring 109. The cam elements 111a and 111b are spaced at an angular distance apart from each other as exemplarily illustrated in FIG. 7. For each rotation of the cam gear ring 109, the cam elements 111a and 111b are configured to contact the clamping members 134 exemplarily illustrated in FIG. 6, of each of at least two of the secondary energy collectors 113, 114, 115, and 116 exemplarily illustrated in FIG. 1, to unclamp at least two of the secondary energy collectors 113, 114, 115, and 116 from at least two of the pins 112a, 112b, 112d, and 112c respectively, exemplarily illustrated in FIG. 1. The inclusion of two cam elements 111a and 111b ensures engagement of at least two of the secondary energy collectors 113, 114, 115, and 116 with the central gear 124 per cam ring circulation cycle. That is, multiple cam elements, for example, 111a and 111b ensure that each of the secondary energy collectors 113, 114, 115, and 116 are released more than once during each rotation of the cam gear ring 109. The incorporation of more than one cam element 111a increases efficiency of the energy harvester system 100 by ensuring that each of the secondary energy collectors 113, 114, 115, and 116 engages the central gear 124 multiple times during each rotation of the cam gear ring 109. In an embodiment, even if more than one secondary energy collector, for example, 113 and 115 are unclamped by the multiple cam elements 111a and 111b, only one of the secondary energy collectors, for example, 113 is allowed to engage with the central gear 124 at a time.

Figure 8:
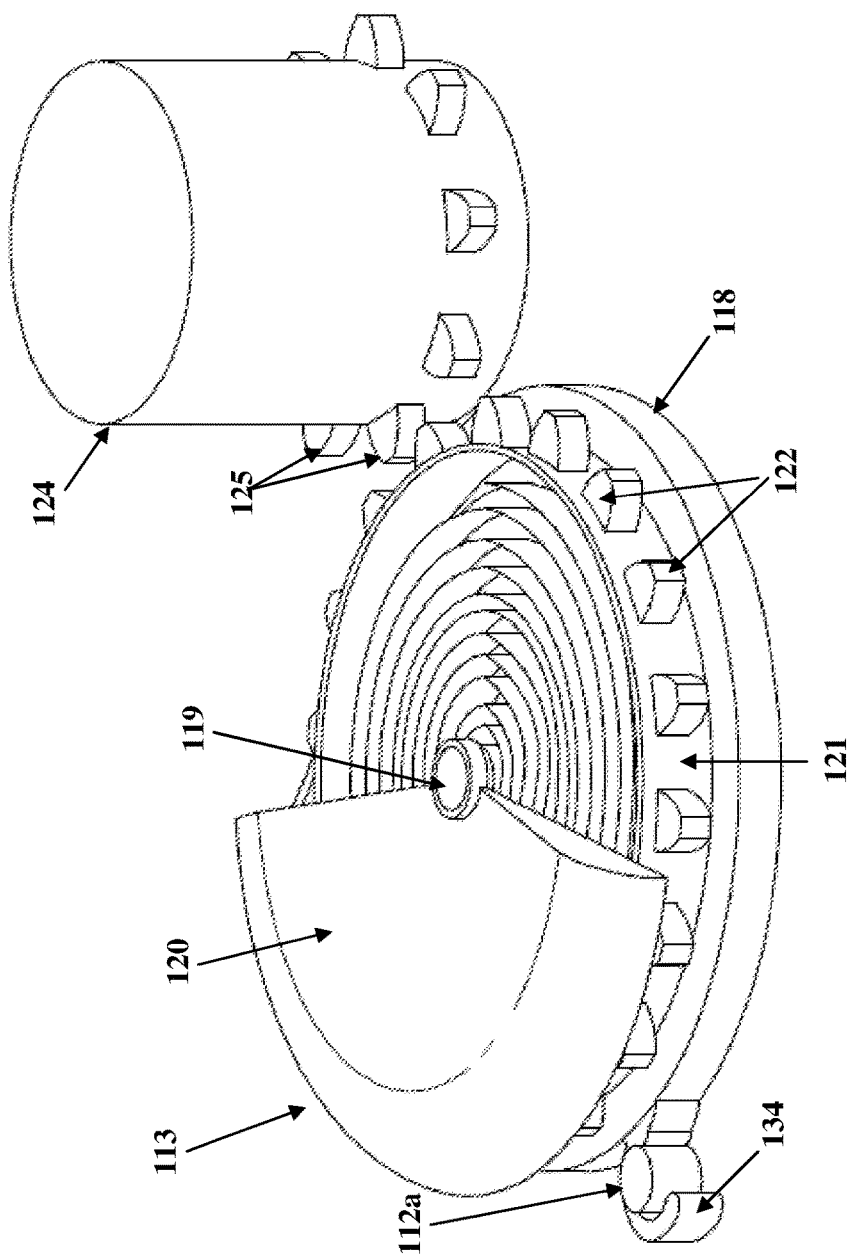
FIG. 8 exemplarily illustrates a top perspective view showing secondary gear tooth elements of the secondary energy collector engaging with central gear tooth elements of a central gear of the energy harvester system.

FIG. 8 exemplarily illustrates a top perspective view showing secondary gear tooth elements 122 of the secondary energy collector 113 engaging with central gear tooth elements 125 of the central gear 124 of the energy harvester system 100 exemplarily illustrated in FIG. 1. The central gear 124 engages with the secondary energy collector 113 which has been unclamped, for example, by engaging the central gear tooth elements 125 with the secondary gear tooth elements 122 of the secondary energy collector 113. The rotating secondary energy collector 113 thereby rotates the central gear 124.

Figure 9A:
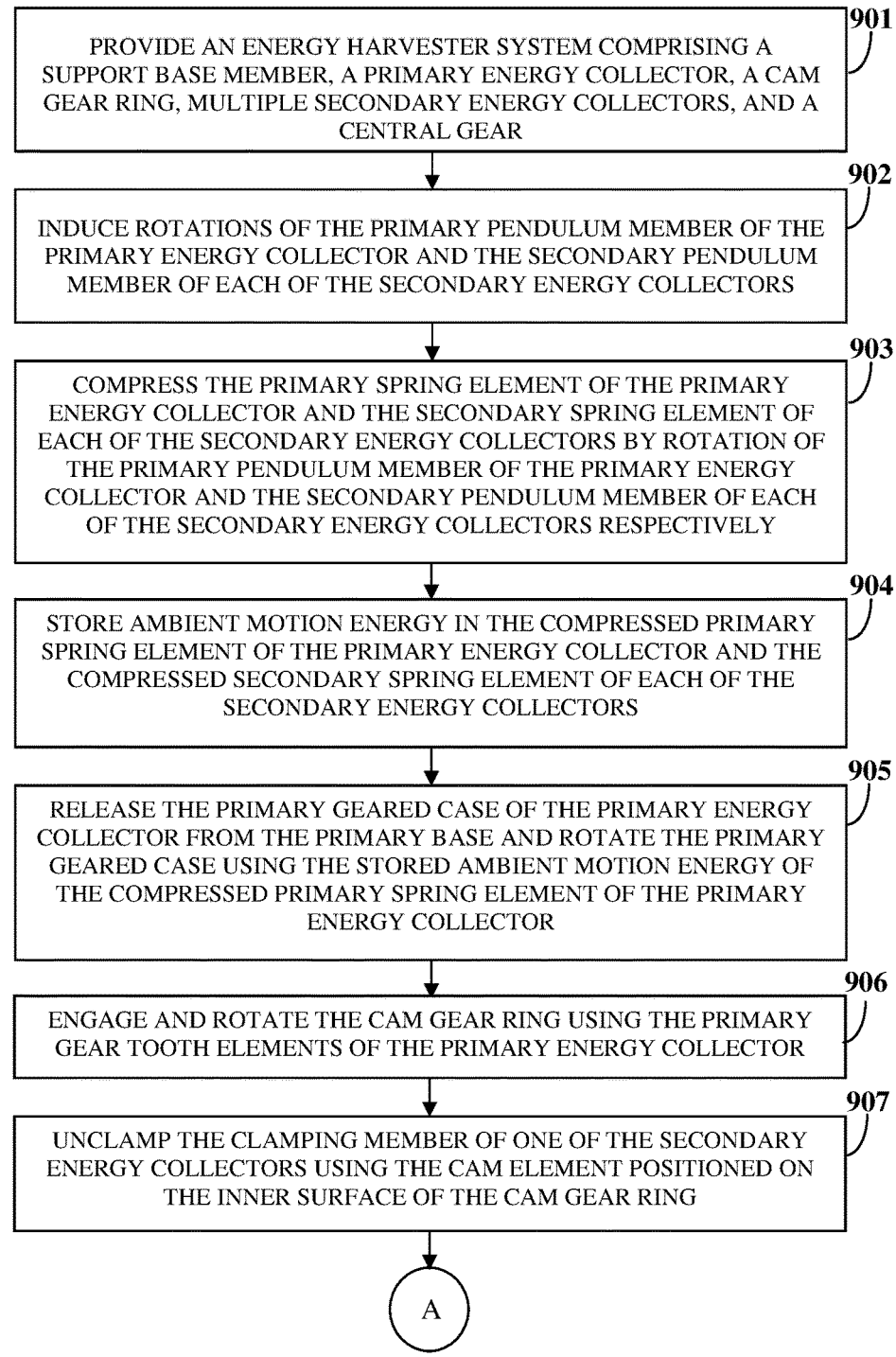
FIGS. 9A-9B exemplarily illustrate a method for harvesting ambient motion energy and generating electrical energy.
Figure 9B:
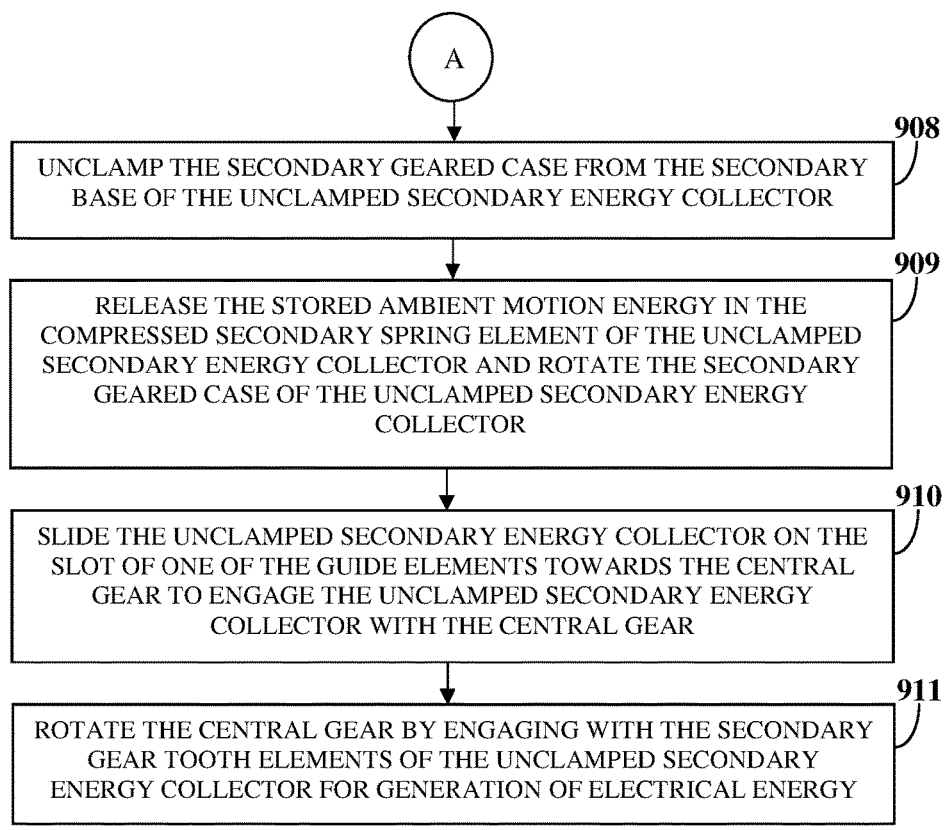

FIGS. 9A-9B exemplarily illustrate a method for harvesting ambient motion energy and generating electrical energy.

In the method disclosed herein, the energy harvester system 100 comprising the support base member 101, the primary energy collector 102, the cam gear ring 109, multiple pins 112a, 112b, 112d, and 112c, multiple secondary energy collectors 113, 114, 115, and 116, multiple guide elements 126a, 126b, 126c, and 126d, and the central gear 124 exemplarily illustrated in FIGS. 1-8, is provided 901. In the method disclosed herein, ambient motion energy induces 902 rotations of the primary pendulum member 105 of the primary energy collector 102 and the secondary pendulum member 120 of each of the secondary energy collectors 113, 114, 115, and 116. The rotating primary pendulum member 105 and the rotating secondary pendulum member 120 of each of the secondary energy collectors 113, 114, 115, and 116 compress 903 the primary spring element 129 of the primary energy collector 102 and the secondary spring element 123 of each of the secondary energy collectors 113, 114, 115, 116 respectively. The compressed primary spring element 129 of the primary energy collector 102 and the compressed secondary spring element 123 of each of the secondary energy collectors 113, 114, 115, and 116 store 904 the ambient motion energy. The stored ambient motion energy of the compressed primary spring element 129 of the primary energy collector 102 rotates 905 the primary geared case 106 of the primary energy collector 102 when the primary geared case 106 is released from the primary base 103 of the primary energy collector 102. The primary gear tooth elements 107 positioned on the primary geared case 106 engages the cam gear ring tooth elements 110 of the cam gear ring 109 and rotates 906 the cam gear ring 109.

The cam element 111a positioned on the inner surface 109a of the cam gear ring 109 contacts and unclamps 907 the clamping member 134 of one of the secondary energy collectors 113, 114, 115, and 116, for example, the secondary energy collector 113. The secondary geared case 121 of the unclamped secondary energy collector 113 is unclamped 908 from the secondary base 118. This results in releasing 909 the stored ambient motion energy from the compressed secondary spring element 123 of the unclamped secondary energy collector 113 and rotating the secondary geared case 121 of the unclamped secondary energy collector 113. The unclamped secondary energy collector 113 slides 910 on the slot 127a of one of the guide elements, for example, 126a towards the central gear 124 to engage the unclamped secondary energy collector 113 with the central gear 124. The secondary gear tooth elements 122 positioned on the secondary geared case 121 of the unclamped secondary energy collector 113 engage with the central gear tooth elements 125 of the central gear 124 to rotate 911 the central gear 124 for generation of electrical energy.

Figure 10:
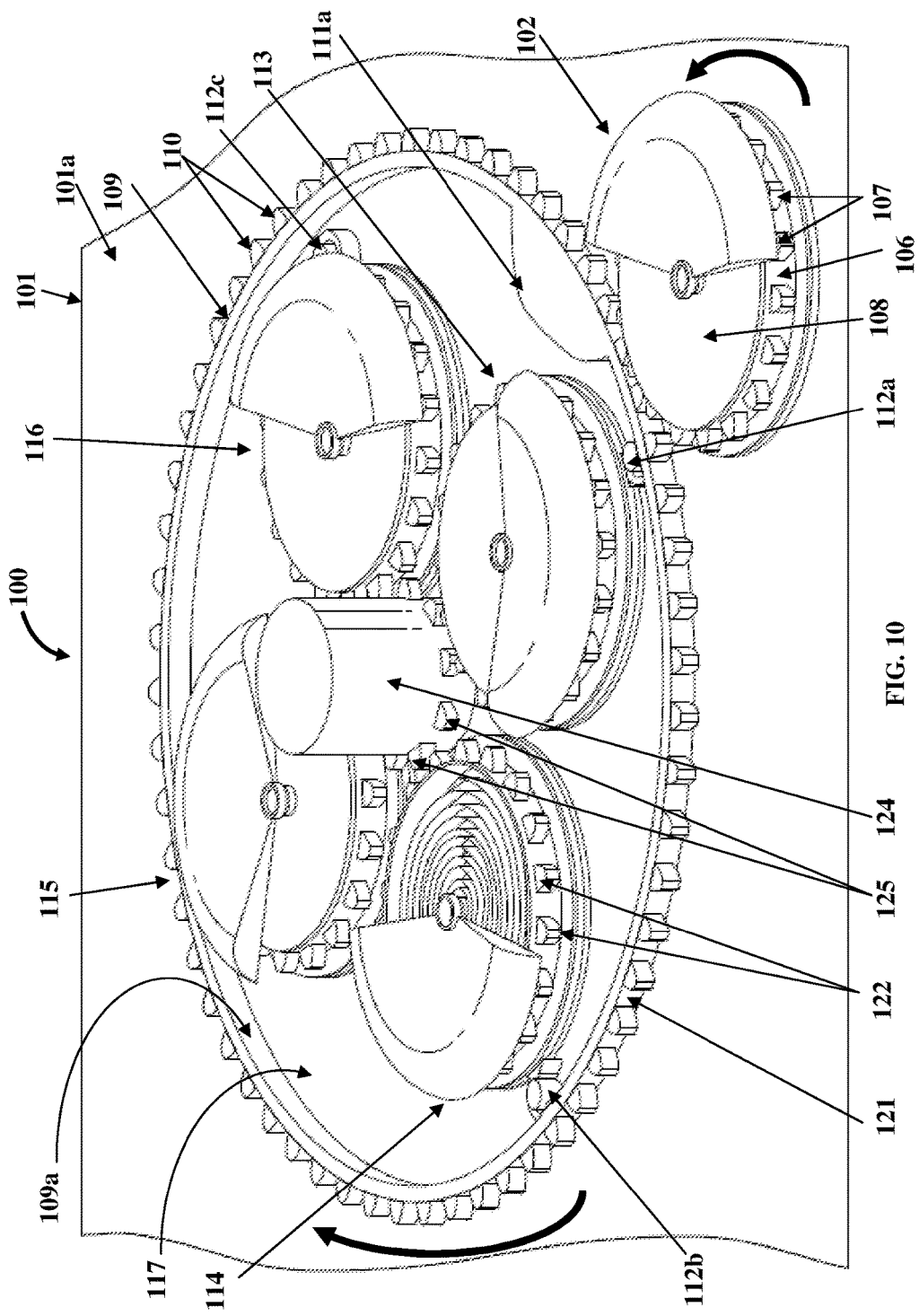
FIG. 10 exemplarily illustrates a top perspective view of the energy harvester system, showing operation of the energy harvester system.

FIG. 10 exemplarily illustrates a top perspective view of the energy harvester system 100, showing operation of the energy harvester system 100. The energy harvester system 100 disclosed herein harnesses ambient motion energy to generate electricity. Consider the example of the energy harvester system 100 being used in tandem with a smartphone to harness ambient motion energy. The energy harvester system 100 is attached to a support base member 101, for example, the rear panel of the smartphone. If the smartphone is held in a user's hand, when the user swings his/her hand while walking, the motion of his/her hand generates kinetic energy. The energy harvester system 100 stores this kinetic energy and converts the stored kinetic energy into a rotary motion of the central gear 124 which is used to generate electrical energy. In an embodiment, the spring elements 123 and 129 of the energy harvester system 100 can be wound manually. The spring elements 123 and 129 store the energy used to wind them as potential energy. This potential energy is converted to an oscillatory motion of the central gear 124. The structural components of the energy harvester system 100 are disclosed in the detailed descriptions of FIGS. 1-8.

Consider the primary pendulum member 105 oscillating due to ambient motion energy. The ambient motion energy rotates the primary pendulum member 105. The primary pendulum member 105 rotates in a clockwise direction or a counterclockwise direction. The oscillation of the primary pendulum member 105 rotates the primary geared case 106. The rotation of the primary geared case 106 compresses the primary spring element 129 as the first end 129a of the primary spring element 129 is fixedly attached to the primary central axial member 104 and the second end 129b of the primary spring element 129 is fixedly attached to the rotating primary geared case 106 as exemplarily illustrated in FIG. 3B. The compression of the primary spring element 129 stores the ambient motion energy in the compressed primary spring element 129. Similarly, each of the secondary energy collectors 113, 114, 115, and 116 induces compression in their respective secondary spring elements 123. The ambient motion energy rotates the secondary pendulum member 120. The secondary pendulum member 120 rotates in a clockwise direction or a counterclockwise direction. The primary geared case 106 is clamped in the primary base groove 130 exemplarily illustrated in FIG. 3B, and the secondary geared case 121 of each of the secondary energy collectors 113, 114, 115, and 116 is clamped to their respective secondary base grooves 133 exemplarily illustrated in FIG. 4B. When the primary geared case 106 is unclamped from the primary base groove 130, the compressed primary spring element 129 releases the stored ambient motion energy and exerts a force on the primary geared case 106, thereby rotating the unclamped primary geared case 106. The ambient motion energy released by the primary spring element 129 is regulated by engaging the primary energy collector 102 with the cam gear ring 109. The cam gear ring 109 rotates in a direction opposite to the direction of rotation of the primary energy collector 102. For example, if the primary energy collector 102 rotates in a counterclockwise direction as exemplarily illustrated in FIG. 10, the cam gear ring 109 rotates in a clockwise direction. The primary energy collector 102 engages the cam gear ring 109 by meshing the primary gear tooth elements 107 with the cam gear ring tooth elements 110. The cam element 111a extending from the inner surface 109a of the cam gear ring 109 moves along with the cam gear ring 109.

As the cam gear ring 109 rotates, the cam element 111a of the cam gear ring 109 contacts the clamping member 134 of, for example, the secondary energy collector 113. The other secondary energy collectors 114, 115, and 116 are clamped to the pins 112b, 112d, and 112c positioned on the support base member 101. The secondary spring element 123 of each of the secondary energy collectors 113, 114, 115, and 116 is in a compressed state. When the secondary energy collector 113 is unclamped from the pin 112a and the secondary geared case 121 of the secondary energy collector 113 is unclamped from the secondary base groove 133, the compressed secondary spring element 123 of the secondary energy collector 113 releases the stored ambient motion energy. The ambient motion energy released by the secondary spring element 123 is regulated. The compressed secondary spring element 123 of the secondary energy collector 113 exerts a force on the unclamped secondary geared case 121, thereby producing a rotary motion of the secondary geared case 121 of the secondary energy collector 113. In this example, the rotating secondary energy collector 113 slides along the slot 127a of the guide element 126a to engage and rotate the central gear 124. When the cam gear ring 109 rotates and the cam element 111a moves out of contact with the engaged secondary energy collector 113, a restoring spring element 128a of the guide element 126a exemplarily illustrated in FIG. 11 pushes the secondary energy collector 113 back to clamp the secondary energy collector 113 to the pin 112a. The cam element 111a then proceeds to unclamp the next secondary energy collector 114 from the pin 112b. The entire process repeats for each of the other secondary energy collectors 114, 115, and 116. When the cam element 111a moves away, the secondary energy collector 114 slides back and the clamping member 134 clamps to the pin 112b. The same process is repeated with the next secondary energy collector in line, for example, the secondary energy collector 115. Hence, for each rotation of the cam gear ring 109, the cam element 111a unclamps each of the secondary energy collectors 113, 114, 115, and 116 at least once.

Figure 11:
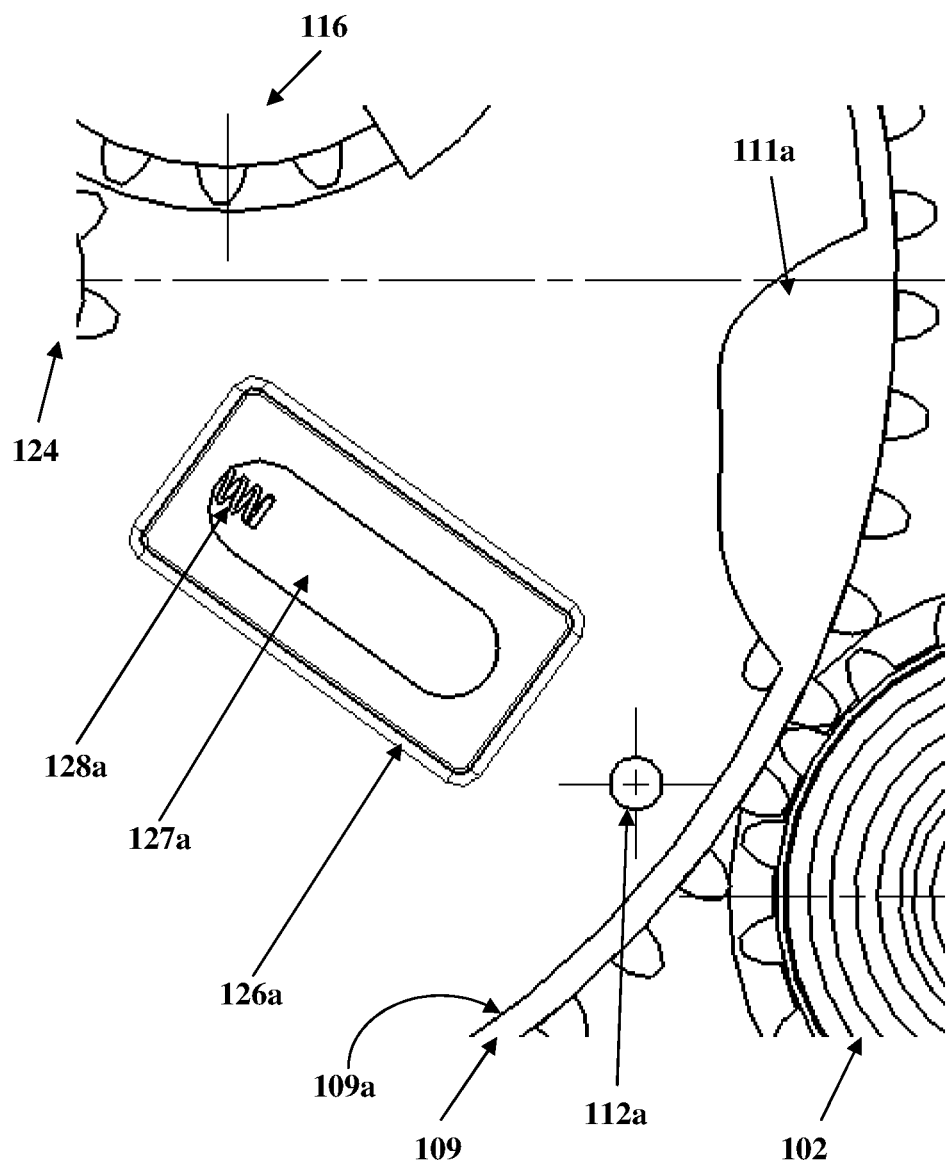
FIG. 11 exemplarily illustrates a top plan view showing a guide element of the energy harvester system.

FIG. 11 exemplarily illustrates a top plan view showing a guide element 126a of the energy harvester system 100 exemplarily illustrated in FIG. 1. As disclosed in the detailed description of FIG. 10, a secondary energy collector 113 is released from the pin 112a when the cam element 111a contacts the clamping member 134 of the secondary energy collector 113. When the secondary energy collector 113 is released from the pin 112a, the secondary energy collector 113 slides along the guide element 126a, compresses the restoring spring element 128a, and engages with the central gear 124 thereby producing a rotation of the central gear 124. When the cam element 111a moves away from the secondary energy collector 113, the restoring spring element 128a pushes the secondary energy collector 113 away from the central gear 124 and allows the clamping member 134 of the secondary energy collector 113 to clamp the pin 112a, thereby restoring the secondary energy collector 113 to a clamped position. The process repeats for the next secondary energy collector, for example, 114 that the cam element 111a contacts.

Figure 12:
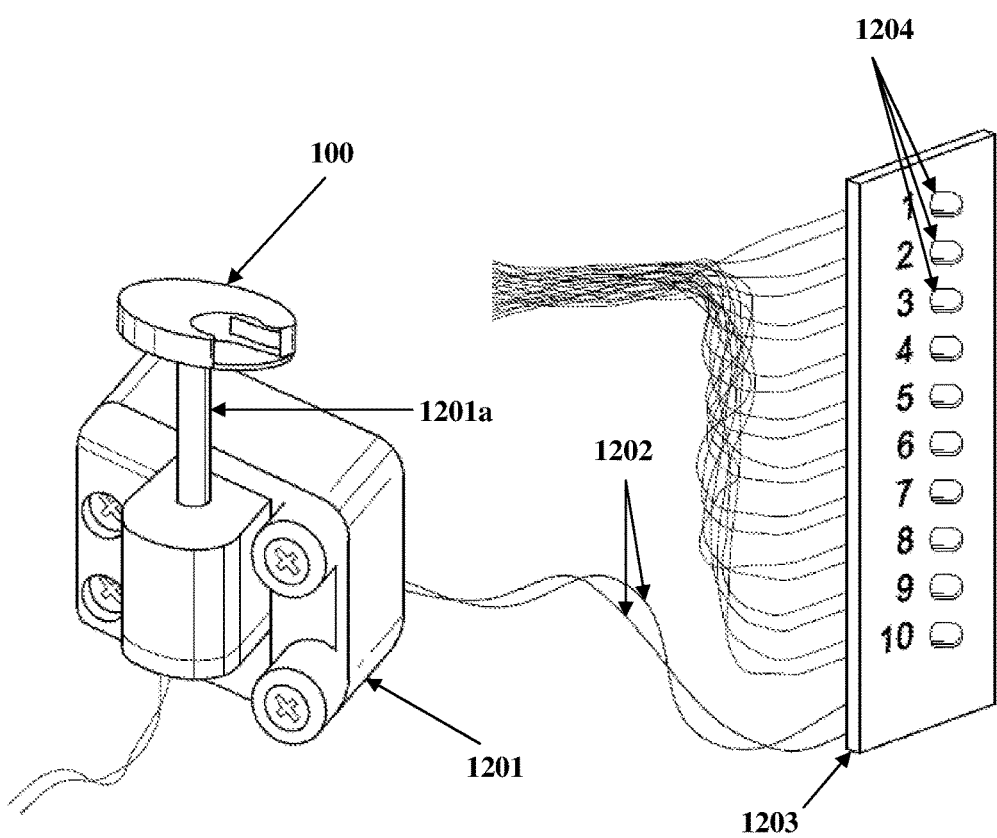
FIG. 12 exemplarily illustrates the energy harvester system coupled to a direct current generator for powering light emitting diodes.

FIG. 12 exemplarily illustrates the energy harvester system 100 coupled to a direct current (DC) generator 1201 for powering light emitting diodes (LEDs) 1204. The energy harvester system 100 can be used to generate sufficient power for powering, for example, about ten parallel LEDs 1204. In an application, the central gear 124 of the energy harvester system 100 exemplarily illustrated in FIG. 1, is coupled to a rotor 1201a of the DC generator 1201. The rotary motion of the central gear 124 of the energy harvester system 100 is transmitted to the rotor 1201a of the DC generator 1201, which converts the rotary motion to electrical energy. The output voltage generated by the energy harvester system 100 is, for example, about 3V, and the power output is, for example, about 150 mW. The generated current is transmitted to the LEDs 1204 via electrical wires 1202. The LEDs 1204 are mounted on a support board 1203, for example, in a parallel connection. The current drawn by each LED 1204 is, for example, about 5 mA.

Figure 13A:
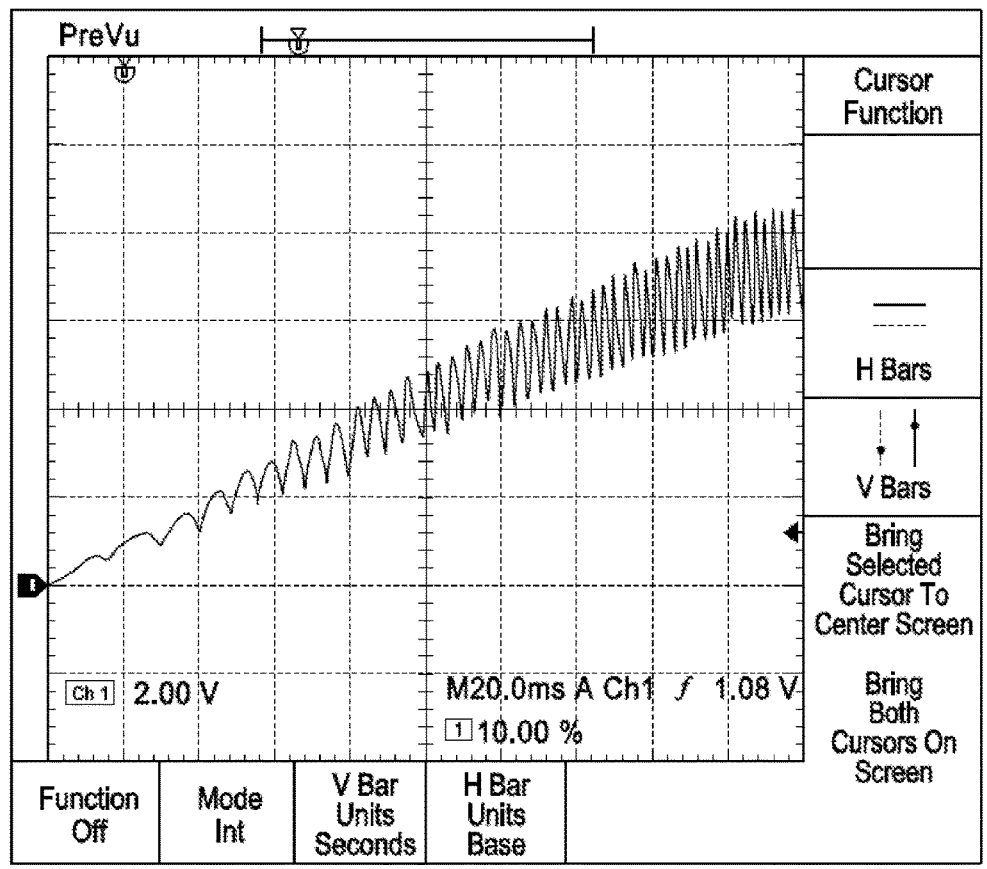
FIG. 13A exemplarily illustrates a graphical representation showing an unfiltered voltage output of the energy harvester system for each release of a primary spring element and a secondary spring element.

FIG. 13A exemplarily illustrates a graphical representation showing an unfiltered voltage output of the energy harvester system 100 for each release of the primary spring element 129 and the secondary spring element 123 exemplarily illustrated in FIGS. 1-2. The voltage output curve exemplarily illustrated in FIG. 13A, shows the unfiltered output of the energy harvester system 100. The peak output voltage is shown to reach, for example, about 12V. The output voltage ripple indicates that the rotation speed of the direct current (DC) generator 1201 exemplarily illustrated in FIG. 12, can reach, for example, about 3000 rpm.

Figure 13B:
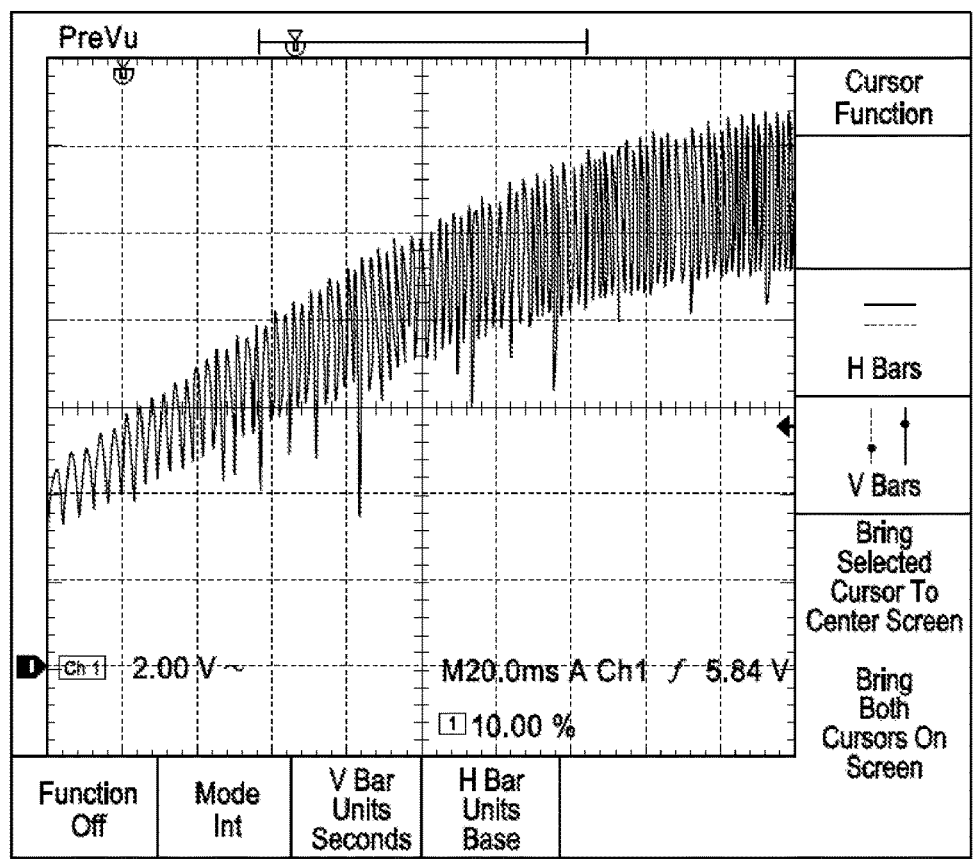
FIG. 13B exemplarily illustrates a graphical representation showing a filtered voltage output of the energy harvester system for each release of a primary spring element and a secondary spring element.

FIG. 13B exemplarily illustrates a graphical representation showing a filtered voltage output of the energy harvester system 100 for each release of the primary spring element 129 and the secondary spring element 123 exemplarily illustrated in FIGS. 1-2. A direct current (DC) generator 1201 exemplarily illustrated in FIG. 12, powered by the energy harvester system 100, is connected to an oscilloscope to obtain this voltage output. For each release of the primary spring element 129 and the secondary spring element 123, the voltage output curve exemplarily illustrated in FIG. 13B, shows the filtered output of the energy harvester system 100 using capacitors to overcome the ripple effects. The voltage output curve shows that the peak output voltage can reach, for example, about 12V. The output voltage ripple indicates that the rotation speed of the DC generator 1201 can reach, for example, about 3000 rpm.

The foregoing examples have been provided merely for the purpose of explanation and are in no way to be construed as limiting of the energy harvester system 100 disclosed herein. While the energy harvester system 100 has been described with reference to various embodiments, it is understood that the words, which have been used herein, are words of description and illustration, rather than words of limitation. Further, although the energy harvester system 100 has been described herein with reference to particular means, materials, and embodiments, the energy harvester system 100 is not intended to be limited to the particulars disclosed herein; rather, the energy harvester system 100 extends to all functionally equivalent structures, methods and uses, such as are within the scope of the appended claims. Those skilled in the art, having the benefit of the teachings of this specification, may effect numerous modifications thereto and changes may be made without departing from the scope and spirit of the energy harvester system 100 disclosed herein in its aspects.

We claim:
1. An energy harvester system comprising:
   a support base member;
   a primary energy collector attached to said support base member;
   a cam gear ring operably engaged to said primary energy collector and rotated by said primary energy collector;
   a plurality of secondary energy collectors positioned in a space defined by said cam gear ring and rotated on receiving ambient motion energy, wherein one of said secondary energy collectors is unclamped from said support base member and slides towards a central gear when said cam gear ring contacts said one of said secondary energy collectors, while other said secondary energy collectors are clamped on said support base member; and
   said central gear operably engaged to said unclamped one of said secondary energy collectors that slid towards said central gear to rotate with said unclamped one of said secondary energy collectors for generation of electrical energy.

2. The energy harvester system of claim 1, wherein said primary energy collector comprises:
   a primary base attached to an upper surface of said support base member;
   a primary central axial member attached to said primary base;
   a primary pendulum member rotatably connected to said primary central axial member, said primary pendulum member actuated by said ambient motion energy and rotated in one of a clockwise direction and a counterclockwise direction;
a primary geared case encircling said primary central axial member, rigidly attached to said primary pendulum member, and running along a primary base groove configured in said primary base, said primary geared case comprising a plurality of primary gear tooth elements positioned on an outer surface of said primary geared case, said primary geared case configured to rotate along said primary base groove; and
a primary spring element wound around said primary central axial member within said primary geared case, said primary spring element comprising a first end fixedly attached to said primary central axial member and a second end fixedly attached to an inner surface of said primary geared case, wherein said primary spring element is compressed by rotation of said primary pendulum member and stores said ambient motion energy, and wherein said compressed primary spring element releases said stored ambient motion energy to rotate said primary geared case.

3. The energy harvester system of claim 1, wherein said each of said secondary energy collectors comprises:
a secondary base attached to an upper surface of said support base member;
a secondary central axial member attached to said secondary base;
a secondary pendulum member rotatably connected to said secondary central axial member, said secondary pendulum member actuated by said ambient motion energy and rotated in one of a clockwise direction and a counterclockwise direction;
a secondary geared case encircling said secondary central axial member, rigidly attached to said secondary pendulum member, and running along a secondary base groove configured in said secondary base, said secondary geared case comprising a plurality of secondary gear tooth elements positioned on an outer surface of said secondary geared case, said secondary geared case configured to rotate along said secondary base groove; and
a secondary spring element wound around said secondary central axial member within said secondary geared case, said secondary spring element comprising a first end fixedly attached to said secondary central axial member and a second end fixedly attached to an inner surface of said secondary geared case, wherein said secondary spring element is compressed by rotation of said secondary pendulum member and stores said ambient motion energy, and wherein said compressed secondary spring element releases said stored ambient motion energy to rotate said secondary geared case.

4. The energy harvester system of claim 1, wherein each of said secondary energy collectors comprises a clamping member attached to and extending from a secondary base of said each of said secondary energy collectors, wherein said clamping member is configured to clamp said each of said secondary energy collectors to one of a plurality of pins extending from an upper surface of said support base member and positioned proximal to an inner surface of said cam gear ring, and wherein said clamping member is further configured to unclamp said each of said secondary energy collectors from said one of said pins when said cam gear ring contacts said clamping member.

5. The energy harvester system of claim 1, further comprising a plurality of pins extending from an upper surface of said support base member and positioned proximal to an inner surface of said cam gear ring, wherein each of said pins is configured to engage with a clamping member of each of said secondary energy collectors for clamping said each of said secondary energy collectors to said support base member.

6. The energy harvester system of claim 1, wherein each of said secondary energy collectors comprises a guide projection extending from a lower surface of a secondary base of said each of said secondary energy collectors, wherein said guide projection of said unclamped one of said secondary energy collectors is configured to slide within a slot of a guide element positioned on an upper surface of said support base member within said space defined by said cam gear ring to slide said unclamped one of said secondary energy collectors towards said central gear.

7. The energy harvester system of claim 6, wherein said guide projection of said each of said secondary energy collectors is of a geometric shape conforming to a shape of said slot of said guide element.

8. The energy harvester system of claim 1, wherein said cam gear ring comprises a plurality of cam gear ring tooth elements operably engaged to primary gear tooth elements of said primary geared case of said primary energy collector to rotate said cam gear ring.

9. The energy harvester system of claim 1, wherein said cam gear ring comprises a cam element extending from an inner surface of said cam gear ring, wherein said cam element is configured to contact a clamping member of each of said secondary energy collectors to unclamp said each of said secondary energy collectors from one of a plurality of pins extending from an upper surface of said support base member and positioned proximal to an inner surface of said cam gear ring.

10. The energy harvester system of claim 1, wherein said cam gear ring comprises a plurality of cam elements extending from an inner surface of said cam gear ring, wherein for each rotation of said cam gear ring, said cam elements are configured to contact a clamping member of each of at least two of said secondary energy collectors to unclamp said each of said at least two of said secondary energy collectors from each of at least two of a plurality of pins extending from an upper surface of said support base member and positioned proximal to said inner surface of said cam gear ring, wherein one of said unclamped at least two of said secondary energy collectors engages said central gear at a time.

11. The energy harvester system of claim 1, further comprising a plurality of guide elements positioned on an upper surface of said support base member within said space defined by said cam gear ring, wherein each of said guide elements comprises a slot configured to slidably engage with a guide projection of each of said secondary energy collectors, wherein said unclamped one of said secondary energy collectors is configured to slide towards said central gear via a corresponding one of said guide elements.

12. The energy harvester system of claim 11, further comprising a restoring spring element positioned in said each of said guide elements for returning said unclamped one of said secondary energy collectors to a clamped position.

13. The energy harvester system of claim 1, wherein said secondary energy collectors are positioned concentrically around said central gear.

14. An energy harvester system comprising:
a support base member;

a primary energy collector attached to said support base member;

a cam gear ring operably engaged to said primary energy collector and rotated by said primary energy collector;

a plurality of secondary energy collectors positioned in a space defined by said cam gear ring and rotated on receiving ambient motion energy, wherein said each of said secondary energy collectors comprises a guide projection extending from a lower surface of said each of said secondary energy collectors;

a plurality of guide elements positioned on an upper surface of said support base member within said space defined by said cam gear ring and below said secondary energy collectors, each of said guide elements comprising a slot configured to slidably engage with said guide projection of said each of said secondary energy collectors, wherein one of said secondary energy collectors is unclamped from said support base member and slides towards a central gear by sliding of said guide projection of said unclamped one of said secondary energy collectors through said slot of one of said guide elements, when said cam gear ring contacts said one of said secondary energy collectors, while other said secondary energy collectors are clamped on said support base member; and said central gear operably engaged to said unclamped one of said secondary energy collectors that slid towards said central gear to rotate with said unclamped one of said secondary energy collectors for generation of electrical energy.

15. The energy harvester system of claim 14, further comprising a restoring spring element positioned in said each of said guide elements for returning said unclamped one of said secondary energy collectors to a clamped position.

16. The energy harvester system of claim 14, wherein said guide projection of said each of said secondary energy collectors is of a geometric shape conforming to a shape of said slot of said one of said guide elements.

17. An energy harvester system comprising:
a support base member;
a primary energy collector attached to said support base member;
a cam gear ring operably engaged to said primary energy collector and rotated by said primary energy collector;
a plurality of pins extending from an upper surface of said support base member and positioned proximal to an inner surface of said cam gear ring;
a plurality of secondary energy collectors positioned in a space defined by said cam gear ring and rotated on receiving ambient motion energy, wherein said each of said secondary energy collectors comprises:
a guide projection extending from a lower surface of said each of said secondary energy collectors; and a clamping member attached to and extending from said each of said secondary energy collectors, said clamping member configured to clamp said each of said secondary energy collectors to one of said pins on said upper surface of said support base member, and said clamping member further configured to unclamp said each of said secondary energy collectors from said one of said pins when said cam gear ring contacts said clamping member;

a plurality of guide elements positioned on said upper surface of said support base member within said space defined by said cam gear ring and below said secondary energy collectors, each of said guide elements comprising a slot configured to slidably engage with said guide projection of said each of said secondary energy collectors, wherein one of said secondary energy collectors is unclamped from said one of said pins and slides towards a central gear by sliding of said guide projection of said unclamped one of said secondary energy collectors through said slot of one of said guide elements, when said cam gear ring contacts said one of said secondary energy collectors, while other said secondary energy collectors are clamped to other of said pins on said support base member; and said central gear operably engaged to said unclamped one of said secondary energy collectors that slid towards said central gear to rotate with said unclamped one of said secondary energy collectors for generation of electrical energy.

18. The energy harvester system of claim 17, wherein said cam gear ring comprises a cam element extending from an inner surface of said cam gear ring, wherein said cam element is configured to contact said clamping member of said each of said secondary energy collectors to unclamp said each of said secondary energy collectors from said one of said pins on said support base member.

19. The energy harvester system of claim 17, wherein said cam gear ring comprises a plurality of cam elements extending from an inner surface of said cam gear ring, wherein for each rotation of said cam gear ring, said cam elements are configured to contact said clamping member of each of at least two of said secondary energy collectors to unclamp said each of said at least two of said secondary energy collectors from each of at least two of said pins on said support base member, wherein one of said unclamped at least two of said secondary energy collectors engages said central gear at a time.

20. The energy harvester system of claim 17, further comprising a restoring spring element positioned in said each of said guide elements for returning said unclamped one of said secondary energy collectors towards said one of said pins for clamping by said clamping member.

* * * * *